Patented Oct. 27, 1931

1,829,431

UNITED STATES PATENT OFFICE

HUGH E. ALLEN, OF CHICAGO, ILLINOIS, ASSIGNOR OF ONE-HALF TO ALBERT G. McCALEB, OF EVANSTON, ILLINOIS

CONDIMENTATION OF GROUND MEATS

No Drawing. Application filed December 4, 1930. Serial No. 499,976.

This invention relates to the condimentation of ground meats and particularly relates to the manufacture of spiced or flavored meat preparations, for example sausages, Frankfurters, bologna, meatloaves and the like.

One of the objects of the invention is to provide an improved seasoning material of the type described and claimed in United States Patent No. 1,781,154, issued November 11, 1930.

A further object of the invention is to provide a seasoning material including sugar as a dispersion base, and including a protective agent to protect the base from water.

A further object of the invention is to provide an improved seasoning material including an ingredient which prevents volatilization of the flavoring constituents during preparation, storage and use.

A further object of the invention is to provide an improved process of preparing flavored or spiced ground meats.

Further objects and advantages will appear from the following description of the invention.

According to the invention I employ as flavoring agents extracts such as oleo-resins of peppers and the essential oils of spices, and/or distilled spice essences. Such oleo-resins, essential oils, and essences are employed together with a suitable protective agent, and are distributed over a dispersion agent or carrier, which may suitably be a sugar.

I prefer to employ edible fats and oils, and particularly vegetable oils as the protective agent, but I do not intend to be limited thereto, since I may employ mineral oils such as medicinal white oils and other materials having similar functions in my composition, such oils and materials necessarily being innocuous to the system of the consumer. I have obtaned excellent practical results by employing cocoa butter, cocoanut oil, and peanut oil as protective agents.

The protective agent is preferably liquid at ordinary temperatures, although substances which are solid at ordinary temperatures may be employed, the mixing or incorporation with the other ingredients of my seasoning material being effected at temperatures at which such substances are liquid or sufficiently soft to permit their thorough dispersion throughout the mass.

The oleo-resins, essential oils, and essences of desired varieties and in desired relative proportions, together with the protective agent, in suitable amount, are added to a relatively large amount of a sugar, sucrose being preferably employed. Coarse sugar or granulated sugar is suitably employed. The ingredients are ground together for a substantial period of time, to break up the sugar particles, and permit the extract and the protective agent to become distributed upon the sugar particles. The extracts become incorporated or dissolved in the protective agent, and the resulting mixture or solution is distributed over the sugar particles and is adsorbed upon their surfaces and in the cracks and fractures therein. Owing to the solution of the extracts in the protective agent, they are volatilized only to a slight extent during the grinding and after the grinding is completed. The grinding is preferably continued until the sugar is sub-divided to a semi-pulverulent condition. The flavoring extracts and the protective agent may be admixed or incorporated together before being introduced into the sugar.

As a specific example of my seasoning material, I may take 3% of oleo-resins, essential oils and essences, selected to give the desired flavor to the meat. I may admix therewith about 2% of olive oil and add the mixture to 95% of granular sugar. The resulting mixture is ground to a semi-pulverulent condition, whereupon the product may be packed in suitable containers for distribution and sale. During the grinding operation and during the subsequent storage the protective agent holds the spice oils and oleo-resins in solution and prevents their volatilization.

In use, a suitable quantity of the seasoning material, for example about 1%, is added to the meat to be ground. The meat is then ground and the seasoning material is thereby uniformly distributed throughout the mass. When the protective agent is a fat or an oil it possesses an affinity for the fat of the meat so that the oleo-resins, essential oils, and essences are thoroughly dispersed. When the protective material is water-soluble, it dissolves in the aqueous juices of the meat. The sugar is also dissolved in the aqueous juices of the meat and the flavoring extracts are disseminated throughout the mass in an extremely perfect fashion. The sugar exerts a preservative action which is slight on account of the small amount of the seasoning composition ordinarily employed, but is sufficient to restore a small percentage of meat which may have become "off-taste".

It is to be understood that the percentages given above are to be regarded as exemplary only, since the relative percentages of materials may vary within wide ranges to give the same final result, and they will ordinarily vary to a considerable extent, in view of the wide variation in the potency of the flavoring extracts employed.

Having thus described the nature of my invention, what I claim as new and desire to secure by United States Letters Patent is:

1. A seasoning material for ground meats comprising essential oils of spices, oleo-resins of peppers, an oleaginous protective agent in which said oils and oleo-resins are dissolved, and a relatively large quantity of semi-pulverulent sugar upon the particles of which said substances are distributed.

2. A substantially dry material for seasoning ground meats consisting of a major quantity of finely divided sugar having a firm physical union with a minor quantity of edible fatty material in which is dissolved a minor quantity of spice oils and oleo-resins of peppers evenly distributed throughout the sugar.

3. The method of making a material for seasoning ground meats which consists in mixing a minor quantity of flavoring extracts and a minor quantity of an edible fatty substance in which the flavoring extracts are soluble with sugar in relatively coarse form, and grinding the mixture until the sugar has been reduced to a semi-pulverulent state.

In witness whereof, I hereunto subscribe my name this 28th day of November, 1930.

HUGH E. ALLEN.